(12) United States Patent
Albertelli

(10) Patent No.: US 12,104,095 B2
(45) Date of Patent: Oct. 1, 2024

(54) ADHESIVES AND METHODS OF FORMING ADHESIVES

(71) Applicant: Acell Industries Limited, Dublin (IE)

(72) Inventor: Aldino Albertelli, Dublin (IE)

(73) Assignee: Acell Industries Limited, Dublin (IE)

(*) Notice: Subject to any disclaimer, the term of this patent is extended or adjusted under 35 U.S.C. 154(b) by 858 days.

(21) Appl. No.: 17/059,841

(22) PCT Filed: May 30, 2019

(86) PCT No.: PCT/GB2019/051470
§ 371 (c)(1),
(2) Date: Nov. 30, 2020

(87) PCT Pub. No.: WO2019/229436
PCT Pub. Date: Dec. 5, 2019

(65) Prior Publication Data
US 2021/0284880 A1     Sep. 16, 2021

(30) Foreign Application Priority Data

May 30, 2018 (GB) ..................... 1808850

(51) Int. Cl.
| C09J 161/06 | (2006.01) |
|---|---|
| B32B 7/12 | (2006.01) |
| B32B 15/04 | (2006.01) |
| B32B 15/20 | (2006.01) |
| C09J 11/04 | (2006.01) |
| C08K 3/22 | (2006.01) |

(52) U.S. Cl.
CPC ............... *C09J 161/06* (2013.01); *B32B 7/12* (2013.01); *B32B 15/043* (2013.01); *B32B 15/20* (2013.01); *C08K 3/22* (2013.01); *C08K 2003/2227* (2013.01); *C08K 2003/2275* (2013.01); *C08K 2201/005* (2013.01)

(58) Field of Classification Search
CPC ......... C09J 161/06; B32B 7/17; B32B 15/043
See application file for complete search history.

(56) References Cited

U.S. PATENT DOCUMENTS

| 5,916,927 A | 6/1999 | Minagawa et al. |
| 2016/0325526 A1 | 11/2016 | Takihana et al. |

FOREIGN PATENT DOCUMENTS

| CN | 102702986 A | 10/2012 | |
|---|---|---|---|
| CN | 102975430 A | 3/2013 | |
| CN | 103614100 A | 3/2014 | |
| CN | 104927720 A | 9/2015 | |
| CN | 106916553 A | 7/2017 | |
| CN | 107338015 A * | 11/2017 | ......... C08G 18/4825 |
| JP | H0912840 A * | 1/1997 | ............... C08K 3/22 |
| JP | 2002187247 A | 7/2002 | |
| RU | 2149101 C1 | 5/2000 | |
| WO | 2017091974 A1 | 6/2017 | |

OTHER PUBLICATIONS

International Search Report dated Sep. 10, 2019 for PCT/GB2019/051470.
Office Action for Russian Application No. 2020143468/04, dated Jan. 31, 2023.
Search Report for Application No. GB1808850.0, dated Dec. 24, 2018.
Office Action in China for Application No. 201980050530.8, dated Nov. 9, 2023.

* cited by examiner

*Primary Examiner* — Dah-Wei D. Yuan
*Assistant Examiner* — Kristen A Dagenais
(74) *Attorney, Agent, or Firm* — Ryan T. Grace; Advent, LLP

(57) ABSTRACT

The present invention relates to specially formulated adhesives and methods for preparing such adhesives. The present invention also relates to composites and materials formed from such adhesives. More specifically, the present invention is concerned with specially formulated adhesives comprising phenolic resins.

20 Claims, No Drawings

ADHESIVES AND METHODS OF FORMING ADHESIVES

The present invention relates to specially formulated adhesives and methods for preparing such adhesives. The present invention also relates to composites and materials formed from such adhesives. More specifically, the present invention is concerned with specially formulated adhesives comprising phenolic resins.

The term "phenolic resin" describes a wide variety of resin based products that result from the reaction of phenols and aldehydes. Traditionally, phenolic resins are formed by reacting phenols with formaldehyde under either acidic or basic conditions, depending on the product required. When a phenolic resin is formed using a basic catalyst and an excess of formaldehyde (>1 equivalent per phenol equivalent) a thermosetting resin, or "resole", is formed. Typical basic catalysts include hydroxides of alkali metals, such as sodium, potassium, or lithium. Alternatively, phenolic resins can be formed using an acid catalyst producing a pre-polymer (novolac) which can be moulded and subsequently cured.

An adhesive will be understood to include any substance suitable for bonding materials together. It will be appreciated that an adhesive may provide some bonding naturally in the uncured state, or may sometimes require at least some curing to form a bond between materials. Adhesives are generally well known to the person of skill in the art.

The use of phenolic resins for the production of adhesives is known in the art, and a summary of such resins can be found, for examples, in 'Phenolic Resin Adhesives', A. Pizzi, Ecole Nationale Superieure des Technologies et Industries du Bois, Universite de Nancy I, Epinal, France.

The present invention is concerned with specially formulated adhesives made using phenolic resin together with a transition metal hydroxide and/or aluminium hydroxide. Such phenolic resin adhesives may be used for gluing and bonding various materials such as building materials, for example to form composites. Composite materials formed using the adhesives of the present invention have been shown to possess improved properties such as strength and toughness, whilst also being relatively lightweight.

Whilst many composite materials are known in the art, there is a need for materials having improved properties, including but not limited to fire resistance.

Generally in the art, where heat resistant composites are required, the adhesives are used in combination with heat-resistant substrates and the adhesive itself may include fire retardants to reduce its own flammability. However, heat resistance remains a problem where non-heat resistant or insufficiently heat resistant substrates are used. For example, less heat resistant or at least partially flammable materials that are used in substrates in order to provide lighter composite materials.

According to a first aspect of the present invention, there is provided a method for preparing an adhesive, the method comprising providing:
  (i) 1 part by weight of a phenolic resin;
  (ii) 2 to 4 parts by weight of a transition metal hydroxide and/or aluminium hydroxide; and
mixing components (i) and (ii), wherein the mixing is conducted in the presence of 0.2 to 1 parts by weight, relative to the phenolic resin, of a viscosity controlling agent.

It has been surprisingly found that the adhesive of the present invention is able to impart advantageous heat resistance to substrates to which it is bonded compared to conventional phenolic adhesives. For example, the adhesive of the present invention may allow substrates to maintain structural integrity under much higher temperature conditions than are typically possible. Propagation of fire across a substrate may also be advantageously reduced by adhesives prepared by the method of the present invention. In this way, the adhesive may allow substrates to be used that are less heat resistant than would usually be required for a given application, for example to reduce the weight of a composite.

Without wishing to be bound by any particular theory, it is believed that the formulation of the adhesive allows it to advantageously draw heat from a substrate to which it is bonded in order to improve the heat resistance of the substrate, for example in a composite material.

It has also been surprisingly found that the addition of a metal hydroxide compound to the adhesive allows for the amount of catalyst present to be significantly reduced, and even possibly avoided altogether. This can aid in improving the heat and/or fire resistance of the adhesive and thus of the materials to which it is applied.

The lack of catalyst material also enables adhesives in accordance with the present invention to be coloured, and even in some embodiments white, thereby allowing the visual appearance of the adhesive and/or composites formed therefrom to be improved.

Without wishing to be bound by any particular theory, it is believed that the addition of the metal hydroxide compound allows for the adhesive to cure without the need for a catalyst to be present in any significant quantity, or even at all.

Such materials can be fully cured by the application of heat and/or pressure.

A problem with the use of traditional catalysts is the discolouration of the cured resin produced, and therefore the ability to produce composites of different colour finishes and patterns. By use of the adhesive disclosed herein, it is possible to reduce or even alleviate such issues as the amount of catalyst can be reduced, and in some embodiments avoided altogether.

Preferably, the amount of catalyst that is present may be less than 2 wt. % relative to the content of the phenolic resin, more preferably less than 1 wt. % relative to the content of the phenolic resin, yet more preferably less than 0.5 wt. % relative to the content of the phenolic resin, such as less than 0.2 wt. %.

In some embodiments, the adhesive may be substantially free of catalyst. By substantially free, it is meant that the amount of any catalyst present is negligible in terms of the overall effect that it has on the adhesive.

For the avoidance of any doubt, the term catalyst is intended to refer to additives which are known to catalyse the curing of such phenolic resins. Traditionally, such catalysts fall into two main categories, namely acidic and basic.

Examples of acidic catalysts include, but are not limited to, one or more of hydrochloric acid, sulphuric acid and oxalic acid.

Examples of basic catalysts include, but are not limited to, one or more of ammonia, sodium hydroxide, potassium hydroxide, lithium hydroxide, rubidium hydroxide, cesium hydroxide, barium hydroxide, calcium hydroxide and ethylamine.

It will also be appreciated that by reducing the presence of the catalyst material, or even avoided its presence altogether, it is possible to avoid discolouration issues without the need to add colour-stabilising agents, for example, glyoxal, thiones, phosphinic acid salts, phosphonic acid salts such as described above.

Preferably, 2.5 to 3.5 parts by weight of the metal hydroxide are provided in (ii).

As will be appreciated, the number of hydroxide groups relative to each metal atom of the metal hydroxide may vary, for example depending on the oxidation state of the metal or on any additional groups associated with the metal. In preferred embodiments, the metal hydroxide is of the formula $M(OH)_3$, wherein M is a metal.

In accordance with the present invention, the metal hydroxide is one or more of a transition metal hydroxide or aluminium hydroxide. Preferably, the metal of the metal hydroxide is one or more of scandium, vanadium, chromium, manganese, iron, cobalt and aluminium. In particularly preferred embodiments, the metal hydroxide is aluminium hydroxide.

The metal hydroxide may be in any suitable form such that it can be dispersed and mixed with the resin, for example, in the form of a ground powder. In preferred embodiments, the metal hydroxide comprises particles having a particle size distribution with a D90 from 50 to 70 μm, and/or a D50 from 15 to 35 μm, and/or a D10 from 1 to 10 μm. More preferably, the metal hydroxide comprises particles having a particle size distribution with a D90 from 55 to 65 μm, and/or with a D50 from 20 to 30 μm, and/or with a D10 from 2 to 5 μm.

It will be understood by a person of skill in the art that, for example, a D90 of 70 μm refers to 90% of the particles by mass having a particle size of less than 70 μm. Similarly, D50 refers to 50% of the particles and D10 refers to 10% of the particles.

Preferably, at least about 50% of particles of the metal hydroxide have a particle size of from 10 to 50 μm, preferably at least about 70% of particles of the metal hydroxide have a particle size of from 10 to 50 μm.

According to the method of the invention, the mixing is conducted in the presence of 0.2 to 1 parts by weight, relative to the phenolic resin, of a viscosity controlling agent. Preferably, the mixing is conducted in the presence of 0.4 to 0.9 parts by weight of the viscosity controlling agent.

Suitable viscosity controlling agents may be selected from one or more of butanol, chloroform, ethanol, water, acetonitrile, hexane, and isopropyl alcohol. In a preferred embodiment, the viscosity controlling agent is water. Preferably, the viscosity controlling agent is a liquid at room temperature (e.g. 20 to 30° C.).

It will be appreciated that the amount of viscosity controlling agent used may be dependent on the intended use of the adhesive. Where the adhesive should hold its shape, for example to form a layer, it needs to be of a viscosity suitable for forming such a shape, for example, by an extrusion or rolling process. Likewise, where the adhesive is intended to impregnate a material, such as a woven fibre mat or textile, the viscosity must be such that the adhesive can flow around the fibres of the mat or textile and produce an impregnated material. It is considered that the controlling of the viscosity is within the knowledge of the person of skill in the art.

The viscosity controlling agent may be provided as a separate component of the mixture, or may, at least in part, be provided with the phenolic resin, for example as part of a solution or suspension of the resin in a liquid viscosity controlling agent.

By way of example, the adhesive may have a dynamic viscosity range of from 200 to 10,000 mPa·s, as measured according to the standard method ISO 3219:1993.

The phenolic resin used in accordance with the present invention may be any suitable resin and such resins are well-known to the person of skill in the art. By way of example, suitable phenolic resins include those obtained from Satef Hüttenes-Albertus.

In preferred embodiments, the phenolic resin is a phenolic resole resin. Preferably, the phenolic resole resin is a resin having a low formaldehyde content. For example, in preferred embodiments, the phenolic resole resin includes less than 10% by weight of free formaldehyde, preferably less than 1% by weight, more preferably less than 0.5% by weight, for example less than 0.1% by weight.

The adhesive may be produced by mixing the components so as to form a generally homogeneous distribution of the components throughout the material. Any known method may be used to produce the general homogeneous distribution, such as high-shear mixing.

The length of time required to produce a generally homogeneous distribution of the components is dependent on, amongst other things, the amount of each component added, the viscosity of the components and the method of mixing used. In general, a substantially homogeneous distribution of the components can be formed within 5 minutes to 2 days, preferably 10 minutes to 1 day, more preferably within 15 minutes to 10 hours.

The method may further comprise adding fibres to the adhesive or components of the adhesive. For the avoidance of any doubt, the reference to the addition of fibres is intended to include adding the fibres to the adhesive before application to a substrate and/or placing fibres on s substrate and then applying adhesive.

The fibres may be woven or unwoven.

The fibres may be short fibres, or may be longer fibres. The fibres may be loose, for example, the fibres may be arranged in a uni- or multi-directional manner. The fibres may be part of a network, for example woven or knitted together in any appropriate manner. The arrangement of the fibres may be random or regular.

Fibres may provide a continuous filament winding. More than one layer of fibres may be provided. The fibres may be in the form of a layer. Where the fibres are in the form of a layer, they may be in the form a fabric, mat, felt or woven or other arrangement.

In an embodiment, the fibres may be selected from one or more of mineral fibres (such as finely chopped glass fibre and finely divided asbestos), chopped fibres, finely chopped natural or synthetic fibres, and ground plastics and resins in the form of fibres.

In addition, the fibres may be selected from one or more of carbon fibres, glass fibres, aramid fibres and/or polyethylene fibres, such as ultra-high molecular weight polyethylene (UHMWPE).

The fibres may include short fibres. The fibres may of a length of 5 cm or less.

Where present, the fibres may be added to the adhesive in a ratio of resin to fibre of 6:1 to 1:3, such as a ratio of from 4:1 to 1:1.

It will be appreciated that the stage of the process at which the fibres are added to the adhesive or components thereof may depend on the nature of the fibres. For example, if the fibres cannot be mixed in the same way as the other components then the components of the adhesive may be mixed and then combined with the fibres. For example, short fibres may be mixed into the adhesive, while for a layer of fibres it may be necessary to impregnate the layer with the mixed adhesive.

The method may further comprise providing one or more fillers in addition to the metal hydroxide in the adhesive.

Preferably, the filler is present in a ratio of total filler to the phenolic resin in an amount of 2.5:1 and greater, wherein the amount of the metal hydroxide (ii) is considered to be included as a filler for this purpose.

In some embodiments, the filler may be present in an amount of 3:1 and greater, and preferably in an amount of 3.5:1 and greater. It will be appreciated that the amount of filler which is added is dependent, in some instances, on the intended use of the adhesive being prepared. It may also be possible to increase the amount of filler whilst still maintaining the desired properties of the adhesive. Accordingly, the amount of filler present may also be in an amount of 5:1 and greater where applicable.

In some embodiments, the amount of filler may be present in an amount of 20:1 and less, such as in an amount of 10:1 and less.

In general, the fillers used in the adhesive described herein may be any particulate solid which insoluble in the resin mixture.

As will be appreciated, it is preferable that the filler is inert to the rest of the components of the adhesive.

The fillers used may be organic or inorganic materials. For some embodiments, it is preferable for the filler to be an inorganic material.

Suitable fillers for use in the adhesive described herein may be selected from one or more of clays, clay minerals, talc, vermiculite, metal oxides, refractories, solid or hollow glass microspheres, fly ash, coal dust, wood flour, grain flour, nut shell flour, silica, ground plastics and resins in the form of powder, powdered reclaimed waste plastics, powdered resins, pigments, and starches. In particular, fillers may include sand and/or silica. In some embodiments the filler may comprise iron oxide.

In addition to the other components described herein, the adhesive may further comprise ethylenediaminetetraacetic acid (EDTA). However, it is not in any way essential to the present inventions.

In preferred embodiments, the fillers do not substantially comprise silicates and/or carbonates of alkali metals. This is due to the fact that solids having more than a slightly alkaline reaction, for example silicates and carbonates of alkali metals, are preferably avoided because of their tendency to react with the acid hardener. However, solids such as talc, which have a very mild alkaline reaction, in some cases because of contamination with more strongly alkaline materials such as magnesite, are acceptable for use as fillers.

The adhesive will generally not comprise a release agent. In some instances, a release agent may comprise a metal-fatty acid salt, for example a stearate salt. For example, in some instances a release agent may comprise zinc stearate, calcium stearate or magnesium stearate, in particular zinc stearate.

Preferably, the amount of release agent that is present may be less than 1 wt. % relative to the content of the phenolic resin, more preferably less than 0.5 wt. % relative to the content of the phenolic resin, such as less than 0.2 wt. %.

In preferred embodiments, the adhesive is substantially free of release agents, such as the release agents described previously. By substantially free, it is meant that the amount of any release agent present is negligible in terms of the overall effect that it has on the adhesive.

In a further aspect, the present invention provides an adhesive prepared by the methods described herein.

In a further aspect, the present invention provides an adhesive comprising:

(i) 1 part by weight of a phenolic resin;
(ii) from 2 to 4 parts by weight of a transition metal hydroxide and/or aluminium hydroxide; and
(iii) from 0.2 to 1 parts by weight of a viscosity controlling agent.

It will be understood that the adhesive, the phenolic resin, the metal hydroxide and the viscosity controlling agent may be substantially as described previously herein.

In preferred embodiments, the adhesive further comprises fibres and/or fillers as described previously herein.

The adhesive may comprise catalyst in an amount as described previously herein.

The adhesive may be substantially free of catalyst or free of catalyst as described previously herein.

In a further aspect, the present invention provides method for making a composite material comprising applying the adhesive as described preciously herein to a substrate such that the adhesive bonds to the substrate.

As previously described, the adhesive of the present invention may impart increased heat resistance to a substrate to which it is bonded. For example, where a metal substrate such as aluminium is used, the adhesive may advantageously cause the substrate to maintain its structural integrity and prevent the substrate from undergoing substantial deformation or melting at temperatures where this occurs in the absence of the adhesive.

In addition, where the adhesive it applied to a substrate that may typically catch fire, for example a wooden panel, the adhesive may advantageously prevent or slow propagation of the fire across the substrate.

Thus, the adhesive of the present invention may produce composites having greatly improved heat and fire resistance, even where substrates having typically low heat resistance are used.

In addition to the above properties, the adhesive of the present invention simultaneously provides good adhesive properties for bonding substrates.

The method may further comprise the step of causing or allowing the adhesive to at least partially set.

Preferably, the step of causing or allowing the adhesive to at least partially set comprises heating the adhesive to a suitable temperature.

By way of example, the adhesive may be heated to a temperature of at least 50° C. In some embodiments, the adhesive is heated to a temperature between 100 and 200° C.

By way of further example, the adhesive may be heated for a time period of at least one minute. In general, it will be appreciated that the time necessary to obtain the desired technical effect will depend on the amount of resin, the temperature, as well as the thickness of the material to be cured.

In some embodiments, one or more catalysts or additives may be added to facilitate or to speed up the curing. It will be appreciated that the addition of catalysts or additives may depend on the desired time scale for the process and on the particular resin used.

Nonetheless, the adhesive of the invention may advantageously allow for the amount of catalyst present to be significantly reduced, and even possibly avoided altogether.

The substrate may be any suitable material.

In preferred embodiments, the substrate is in the form of a sheet. The adhesive is preferably distributed in a layer on a surface of the sheet.

Preferably, the adhesive is applied to substantially all of the substrate.

The method may comprise the step of pressing a layer of the adhesive between two substrates to form the composite.

In some embodiments, the pressing is conducted using a heated press such that the adhesive may be cured during the pressing step.

During the pressing step, a pressure of at least 400 Pa may be applied. Suitable pressures include those of between 500 and 7,000 Pa.

In some embodiments, lower pressures may be used or a press may be omitted altogether. For example adhesive and substrate may be pressed together using vacuum, for example by vacuum bagging.

In some embodiments the substrate comprises a thermally conductive material, such that heat applied to the substrate may be distributed across the substrate and the adhesive bonded to the substrate.

Preferably, the substrate comprises a metal. In a particularly preferred embodiment, the substrate comprises aluminium.

The substrate may additionally be formed from inorganic materials such as ceramics, glasses and carbon based materials.

In some embodiments, the substrate may include surface formations for keying with the phenolic resin material. This can improve the bond between the substrate and the phenolic resin material.

The substrate may be formed from natural materials such as wood and cellulose derived products.

The substrate may also be formed from well-known polymeric materials such as polyvinylchloride, polyurethane, polyethylene, polystyrene, phenolics, syntactic polymers and honeycombs.

The substrate materials used may be foamed or unfoamed.

The foam substrate materials may be a crushable material such that, during the application of pressure, the surface of the substrate is moulded.

Preferred foamed materials include foamed phenolic resin or foamed polyurethane resin.

Where the material is foamed it may be open-celled or close-celled.

In a particularly preferred embodiment, the material is an open-cell foam.

Suitable open-cell foams include foamed phenolic resin for example, as manufactured under the brand Acell by Acell Industries Limited.

A particular advantage of using such an open-celled material is that at least a portion of the adhesive may flow into the open-cells of the substrate.

It will be appreciated that the application of heat may improve the flow of adhesive into the open-cells of the substrate.

Preferably the adhesive and substrate are such that the material only partly flows into the substrate during the pressing step so that good bonding between the adhesive and the substrate is obtained while retaining a suitable adhesive thickness for bonding to a second substrate and providing the required mechanical and other properties of the composite formed.

A further advantage with the use of an open-celled substrate material is that gas and/or vapour can be displaced from the pressing region. Preferably the pressing region is that area where the surface of the substrate and the adhesive are being pressed together, preferably in the region of the interface of the substrate and the adhesive.

By removing gas or vapour that might otherwise remain and/or build up in that region, it has been found that the pressure required to form the composite product can be significantly reduced in some examples.

Removal of gas or vapour from the region also aids in the formation of stronger bonds and prevents imperfections which may arise as a result of pressure build-up in a particular region. This can reduce the risk of delamination of the composite layers in the final product, and provide a stable product when exposed to heating/cooling cycles.

Preferably the nature of the surface of the substrate is such that the gas or vapour can escape from the can escape from the pressing region in a direction having at least a component in a direction generally transverse to the pressing direction in which the substrate and adhesive are pressed.

Other formations (as an alternative or in addition) may be provided to assist the displacement of the gas. For example, grooves or channels could be formed in the substrate.

The configuration of the substrate which allows for the displacement of the gas may be inherent in that it arises from the nature of the composition of the substrate itself, and/or it may be provided by subsequent action, for example by machining the substrate or by chemical action on the substrate. Preferably the configuration of the substrate is such that it can release pressure in the pressing region.

The substrate itself may be shaped prior to the step of pressing the adhesive to the substrate.

In addition, or alternatively, the pressing step may involve the use of a shaped mould, and therefore shaping may occur during the pressing step.

Preferably the method further comprises the step of applying a second substrate to the adhesive so that the adhesive additionally bonds to the second substrate.

The second substrate may be substantially as described herein in relation to the first substrate.

In some embodiments, both substrates may be made from the same material. In other embodiments, the substrates may be different. It will be appreciated that the particular arrangement will depend on the intended use of the composite material.

In a preferred embodiment, both substrates comprise a sheet of metal, preferably aluminium, and the method comprises the step of applying the adhesive to provide a layer of adhesive between the sheets.

In some embodiments, the method may comprise providing a layer of adhesive between an aluminium sheet and a second different substrate, for example a polymeric foam substrate.

It will be appreciated that more than two substrates may be bonded together using the adhesive to form a composite. For example, a layered composite may comprise more than two substrate sheets bonded by a layer of the adhesive between each of the substrates.

It will also be appreciated that where multiple substrate layers are used, two or more of the layers will be bonded using the adhesive of the present invention, and other layers may be bonded by any other suitable means.

A further aspect of the present invention provides a composite formed by the methods described herein.

A further aspect of the present invention provides an adhesive as described previously herein, that has been at least partially cured according to the methods described.

A further aspect provides use of an adhesive as described herein to increase the heat resistance of a substrate bonded to the adhesive.

EXAMPLE 1: PREPARATION OF ADHESIVE

An adhesive was formed according to the composition shown in Table 1 by use of a mechanical mixer until such time that the components appeared to be homogeneously combined.

The phenolic resole resin use was an aqueous resole resin having a dry weight of 74-77% and less than 0.1% free formaldehyde obtained from Satef Hüttenes-Albertus as LACFEN ES 81 LF.

The $Al(OH)_3$ is a ground aluminium hydroxide having 99.60% $Al(OH)_3$ content, d10 of 3.5 μm, d50 of 23.0 μm, and d90 of 57.0 μm obtained from CellMark chemicals as ATH G200.

TABLE 1

|  | Relative amount |
|---|---|
| Aqueous phenolic resole resin | 100 |
| Grey sand | 160 |
| $Al(OH)_3$ | 220 |
| Water | 28 |
| Black iron oxide | 2 |
| Glass fibres (chops) | 200 |

EXAMPLE 2

The adhesive of Example 1 was applied to an aluminium sheet having a thickness of greater than 0.5 mm and the adhesive was cured.

The composite was heated using a blowtorch flame (producing a temperature of around 1150° C.) applied to the surface of the aluminium sheet. After 10 to 15 minutes of heating, there was some melting of the aluminium in the local region where the flame was applied. However, the sheet as a whole substantially maintained its structural integrity and remained intact as a single piece bonded to the adhesive. The area affected by melting was, on average, confined to an area of about a 4 cm radius around the centre of the position at which the flame was applied. Even after more than 30 minutes heating, a layer of aluminium remained unmelted between the flame and the adhesive.

EXAMPLE 3

Two aluminium sheets, each having a thickness of less than 0.5 mm, were bonded together by a layer of the adhesive of Example 1. The adhesive was then cured.

The composite was heated as described in Example 2. The area of the first aluminium sheet directly in contact with the flame underwent some melting in the region in which the flame was applied. However, the composite as a whole substantially maintained its structural integrity and the second aluminium sheet did not distort or melt even after more than 30 minutes of heating.

EXAMPLE 4

Two sheets of typical kitchen aluminium foil were attached together by a layer of the adhesive of Example 1 and were coated with the adhesive, which was subsequently cured.

The composite was heated was heated as described in Example 2. The composite maintained structural integrity without breakage. The aluminium in the composite was found to be intact.

EXAMPLE 5

Aluminium shavings were immersed in the adhesive of Example 1 and the adhesive was cured.

This composite was heated as described in Example 2 for more than 30 minutes. There was no structural failure or burning of the composite during this heating.

When aluminium shavings were applied only to the surface of a layer of the adhesive, during the same heating for 30 minutes, the composite did not yield. However, upon cooling of the composite, the area in which the flame was applied was less structurally strong than for the composite having shavings immersed in the adhesive.

EXAMPLE 6

A layer of aluminium powder was deposited on front and rear surfaces of a layer of the adhesive of Example 1, and the adhesive was cured.

When the composite was heated as described in Example 2, results similar to Example 5 were obtained, except that the area directly heated by the flame appeared stronger in comparison. The temperature of the composite where the flame was applied was around 1000° C., and the opposite surface of the composite has a temperature of about 400° C.

COMPARATIVE EXAMPLE 1: HEAT TREATMENT OF SUBSTRATE

When the same heating as in Example 2 is applied to the second sheet of aluminium of Example 3, after it is removed from the adhesive, the aluminium sheet was found to melt and distort rapidly.

The above examples demonstrate that the adhesive of the present invention advantageously allows substrates to maintain structural integrity under heating with a flame at high temperatures. As demonstrated by Comparative Example 1, in the absence of the adhesive, the aluminium substrate rapidly melts and deforms, which contrasts with the results of Example 3, where the structural integrity of the aluminum and composite was maintained.

The invention claimed is:

1. A method of increasing the heat resistance of a substrate bonded to an adhesive comprising applying the adhesive to a substrate such that the adhesive bonds to the substrate, and wherein the adhesive comprises:
   (i) 1 part by weight of a phenolic resin;
   (ii) 2 to 4 parts by weight of a transition metal hydroxide and/or aluminium hydroxide; and
   mixing components (i) and (ii), wherein the mixing is conducted in the presence of 0.2 to 1 parts by weight, relative to the phenolic resin, of a viscosity controlling agent, and
   further comprising the step of applying the adhesive to the substrate such that the adhesive bonds to the substrate.

2. A method according to claim 1, wherein the adhesive comprises from 2.5 to 3.5 parts by weight of the metal hydroxide.

3. A method according to claim 1, wherein the adhesive comprises from 0.4 to 0.9 parts by weight of the viscosity controlling agent, wherein the viscosity controlling agent can be a liquid.

4. A method according to claim 1, wherein the metal hydroxide comprises particles having a particle size distribution with a D90 from 50 to 70 μm, and/or a D50 from 15 to 35 μm, and/or a D10 from 1 to 10 μm.

5. A method according to claim 1, wherein the metal of the metal hydroxide is selected from one or more of scandium, vanadium, chromium, manganese, iron, cobalt and aluminum.

6. A method according to claim 1, wherein the metal hydroxide and/or aluminum hydroxide is of the formula $M(OH)_3$, wherein M is a metal.

7. A method according to claim 1, wherein the adhesive further comprises fibers.

8. A method according to claim 1, wherein the adhesive has a viscosity of from 200 to 10,000 mPas at 20° C. as measured according to the standard method ISO 3219:1993.

9. A method according to claim 1, wherein the adhesive comprises a catalyst in an amount of less than 2 wt. % relative to the content of phenolic resin.

10. A method according to claim 1, wherein the adhesive is substantially free of catalyst.

11. A method according to claim 1, further comprising the step of causing or allowing the adhesive to at least partially set.

12. A method according to claim 11, wherein the step of causing or allowing the adhesive to at least partially set comprises heating the adhesive to a suitable temperature.

13. A method according to claim 12, wherein the adhesive is heated to a temperature of at least 50° C.

14. A method according to claim 12, wherein the adhesive is heated for at least one minute.

15. A method according to claim 1, wherein the substrate is in the form of a sheet.

16. A method according to claim 15, wherein the adhesive is distributed in a layer on a surface of the sheet.

17. A method according to claim 1, wherein the substrate comprises a metal.

18. A method according to claim 17, wherein the substrate comprises aluminum.

19. A method according to claim 1, further comprising the step of applying a second substrate to the adhesive so that the adhesive additionally bonds to the second substrate.

20. A method of increasing the heat resistance of a substrate bonded to an adhesive comprising applying the adhesive to a substrate such that the adhesive bonds to the substrate, and wherein the adhesive comprises:
  (i) 1 part by weight of a phenolic resin;
  (ii) 2 to 4 parts by weight of a transition metal hydroxide and/or aluminium hydroxide; and
  mixing components (i) and (ii), wherein the mixing is conducted in the presence of 0.2 to 1 parts by weight, relative to the phenolic resin, of a viscosity controlling agent,
  wherein the adhesive is substantially free of catalyst.

* * * * *